United States Patent [19]

Mizuhara

[11] Patent Number: 4,678,636

[45] Date of Patent: * Jul. 7, 1987

[54] DUCTILE BRAZING ALLOY CONTAINING REACTIVE METALS PRECIOUS METALS

[75] Inventor: Howard Mizuhara, Hillsborough, Calif.

[73] Assignee: GTE Products Corporation, Stamford, Conn.

[*] Notice: The portion of the term of this patent subsequent to May 8, 2001 has been disclaimed.

[21] Appl. No.: 835,838

[22] Filed: Jan. 31, 1986

Related U.S. Application Data

[63] Continuation of Ser. No. 672,057, Nov. 16, 1984, Pat. No. 4,604,328, which is a continuation of Ser. No. 422,625, Sep. 24, 1982, abandoned.

[51] Int. Cl.⁴ .......................... C22C 5/02; C22C 9/00; C22C 19/03; C22C 30/00

[52] U.S. Cl. .................................. 420/456; 420/457; 420/485; 420/492; 420/497; 420/508; 420/512; 420/463; 420/464

[58] Field of Search .............. 428/606; 420/456, 457, 420/485, 488, 492, 497, 508, 512, 464, 463, 587, 580

[56] References Cited

U.S. PATENT DOCUMENTS

| | | | |
|---|---|---|---|
| 3,438,770 | 4/1969 | Clark et al. | 420/463 |
| 3,597,194 | 8/1971 | Savage | 420/463 |
| 4,447,391 | 5/1984 | Mizuhara | 420/463 |
| 4,486,386 | 12/1984 | Mizuhara | 428/606 |

*Primary Examiner*—L. Dewayne Rutledge
*Assistant Examiner*—Deborah Yee
*Attorney, Agent, or Firm*—Donald R. Castle

[57] ABSTRACT

Reactive metal-precious metal ductile alloys containing controlled amounts of Cu and Ni and mixtures thereof are suitable for brazing ceramics, other non-metallic and metallic materials.

4 Claims, No Drawings

DUCTILE BRAZING ALLOY CONTAINING REACTIVE METALS PRECIOUS METALS

This application is a continuation of application Ser. No. 672,057, filed 11/16/84, now U.S. Pat. No. 4,604,328 which was a continuation of Ser. No. 422,625, filed 9/24/82, now abandoned.

FIELD OF INVENTION

This invention relates to brazing alloys. More particularly it relates to brazing alloys containing a reactive metal having a liquidus temperature above about 890° C.

BACKGROUND

Alloys containing titanium are known. These alloys contain relatively high levels of titanium. Generally the titanium content is above about 7% by weight. These alloys are not ductile and cannot be rolled to a foil in a satisfactory manner and upon brazing contain a brittle dispersed phase.

With regard to brazing a ceramic material to a metal member, the reliability of the brazed joint is good when the brazing alloy is ductile. A ductile alloy is necessary because of the thermal expansion mismatch between metal and ceramic members.

SUMMARY OF THE INVENTION

Reactive metal-precious metal alloys containing specified amounts of nickel, copper, chromium, molybdenum and mixtures thereof have liquidus temperatures in the range of from about 890° C. to about 1400° C.; are ductile and after brazing are relatively free of hard dispersed phases.

DETAILS OF PREFERRED EMBODIMENTS

For a better understanding of the present invention, together with other and further objects, advantages and capabilities thereof, reference is made to the following disclosure and appended claims in connection with the above description of some of the aspects of the invention.

The amount of the reactive metal in the alloys of this invention which also contain a precious metal selected from gold, palladium and mixtures thereof and a third metal seleted from Ni, Cu, Cr, Mo and mixtures thereof cannot appreciably exceed about 5% by weight and achieve a ductile material which upon brazing is free of dispersed phases.

The amount of reactive metal in the alloys of this invention is from about 0.1% by weight to about 5% by weight, with from about 1% by weight to about 3% by weight being preferred. By reactive metal, within the context of this disclosure, is meant titanium, zirconium, vanadium and mixtures thereof. While titanium generally is the preferred reactive metal, alloy compositions of Ti-Zr and Ti-V are equally effective.

The weight percent of the precious metal, which is selected from gold, palladium and mixtures thereof, can vary from about 25% by weight to about 85% by weight. The preferred level is generally from about 28% by weight to about 81% by weight.

The weight precent of the third metal, which is selected from copper, nickel and mixtures, thereof can vary from about 15% by weight to about 70% by weight. When nickel is the third metal it is preferably present in amounts of from about 3% by weight to about 40% by weight. When copper is the third metal it is preferably present in amounts of from about 20% by weight to about 80% by weight.

Chromium is an optional metal which can be added to the alloys of this invention to improve corrosion and oxidation resistance. For this purpose, chromium is added in an amount from about 2% by weight to about 30% by weight and preferably from about 5% to about 10% by weight.

Molybdenum is an optional metal which can be added to the alloys of this invention to prevent high temperature creep. The metal can be added from about 6 to 40% by weight.

Various alloys are prepared by skull melting using a tungsten electrode and an argon atmosphere. The alloys are ductile and are rolled to foils using, an intermediate vacuum anneal. The thickness of the foil is of from about 2 to 6 mils.

The compositions of the alloys and their flow temperatures are given in Table 1.

TABLE I

| Alloy | Element (% by weight) | | | | | | | Brazing Temperature °C. |
|---|---|---|---|---|---|---|---|---|
| | Ti | Au | Pd | Cu | Ni | Cr | Mo | |
| 1 | 2 | 68 | 8 | | 22 | | | 1075 |
| 2 | 2 | 48 | 25 | | 25 | | | 1175 |
| 3 | 2 | 28 | 34 | | 36 | | | 1200 |
| 4 | 2 | 35 | | 63 | | | | 1050 |
| 5 | 1 | 81 | | | 18 | | | 1010 |
| 6 | 3 | | 58 | | 39 | | | 1280 |
| 7 | 2 | 70 | | | 22 | 6 | | 1030 |
| 8 | 2 | 35 | | 60 | 3 | | | 1070 |
| 9 | 3 | | 52 | | 35 | 10 | | 1290 |
| 10 | 2 | 81 | | 17 | | | | 990 |
| 11 | 2 | | 52 | | 29 | 11 | 6 | 1320 |
| 12 | 2 | | | | 69 | | 29 | 1440 |
| 13 | 2 | | 40 | 58 | | | | 1190 |

The alloys are suitable for a variety of brazing applications. For example, alloys 4, 8 and 10 are useful for brazing ceramics to ferrous base alloys such as brazing alumina to an iron-nickel-cobalt alloy known as Kovar, a trademark of Westinghouse Electric Corporation. Alloys 1, 2, 3 and 5 are useful for brazing superalloys such as the nickel-iron-chromium alloy Inconel, a trademark of International Nickel Co. Alloy 7 is useful for brazing stainless steels such as 304 stainless steel.

EXAMPLE 1

Alloys 1, 2 and 3 without Ti are currently produced by WESGO Division of GTE Products Corporation and sold under the trademarks Palniro 7, Palniro 1, and Palniro 4, respectively. These alloys which all are used to braze superalloys in aircraft combine components show excellent brazing characteristics and oxidation and fatigue resistance. When these alloys are used to braze superalloys such as the nickel base alloy Hastelloy X, a trademark of Cabot Corp., Inconel 718 and other superalloys containing Al and/or Ti, nickel plating of these superalloys prior to brazing is required to insure proper wetting. Use of alloys 1, 2 or 3 without prior nickel plating of Inconel 718 produce excellent brazes to 410 stainless steel in a vacuum of $10^{-5}$ mm Hg at respective braze alloy flow temperature listed in Table 1.

EXAMPLE 2

A 2 mil foil of alloy 4 was placed between a 97.5% alumina body produced and sold by WESGO Division of GTE Products Corporation under the trademark of Al—300, and a Kovar metallic sheet and brazed under $10^{-5}$ mm Hg at 1050° C. The alloy melted and brazed the alumina body to the metal sheet with excellent results. Another Kovar sheet was placed on the opposite face of the same alumina body with a 2 mil foil of alloy 10 placed therebetween. The total assembly was heated to 980° C. in a $10^{-5}$ mm Hg vacuum resulting in a second successful braze on a same assembly without melting the original braze. The technique is called step brazing; additional brazes can be carried out using lower temperature brazing alloys on the new assembly.

EXAMPLE 3

Alloy 8 without titanium is produced and sold under a trademark of Nicoro by WESGO Division of GTE Products Corporation. An alloy 8 foil having a 2 mil thickness was placed between Al—300 alumina ceramic and a Kovar alloy sheet and was heated to 1070° C. in $10^{-5}$ mm Hg vacuum resulting in an excellent brazed joint.

EXAMPLE 4

An alloy consisting of, in percent by weight, 82 gold and 18 nickel produced and sold under the trademark Nioro by WESGO Division of GTE Products Corporation is used to braze aircraft turbine components because of its excellent fatigue property and brazing capability. In order to braze Hastelloy X using Nioro alloy, the Hastelloy X surface must first be nickel plated to about 1 mil thickness. In using alloys 5 and 7 to braze Hastelloy X (without nickel plating) to 410 stainless steel, 4 mil foils of alloys 5 and 7 were placed between two assemblies, respectively, of Hastelloy X and 410 stainless steel. These two assemblies were placed in vacuum furnace and heated to 1030° C. in a $10^{-5}$ mm Hg vacuum. Excellent brazes were made by both alloys; exposing the assemblies to air at 900° C. produced greater discoloration in the chromium-free alloy (alloy 5) indicating, however, that for severe environments, chromium in the alloy is preferred.

EXAMPLE 5

Alloy 6 is useful for brazing metal to metal, ceramic to ceramic, and ceramic to metal for high temperature applications. Alloy 9 with 10% chromium has the same capability with the additional characteristic of high temperature oxidation resistance. To test the ceramic to ceramic bonding capability, three ceramic flocks, each being 1"×1"×½" and made of Al—300 alumina ceramic, were stacked with a 2 mil alloy 6 foil between blocks 1 and 2, and a 2 mil alloy 9 foil between blocks 2 and 3. This asssembly was placed in a vacuum furnace and heated to 1290° C. under $10^{-5}$ mm Hg vacuum and cooled. The polished cross section showed excellent bonding by both alloys 6 and 9. An oxidation test at 900° C. in air showed slightly greater oxidation discoloration on the chromium-free alloy 6.

EXAMPLE 6

Two graphite blocks having dimensions of 1"×1"×½" were bonded across the 1"×1" face using a 2 mil piece of alloy 12 at 1440° C. under $10^{-5}$ mm Hg vacuum. The resulting brazed joint was excellent.

EXAMPLE 7

A 4 mil foil of alloy 13 was used to edge bond a 410 stainless steel piece measuring 1"×½"×30 mil to a 1"×1"×.100" alumina substrate at $10^{-5}$ mm Hg under a 1190° C. brazing temperature. The brazed joint was strong and had a good fillet.

EXAMPLE 8

A 4 mil foil of alloy 11 was placed between two Al—300 alumina ceramic 1"×1"×.25" blocks. The assembly was heated to 1320° C. in $10^{-5}$ mm Hg vacuum and cooled. Examination of the polished section of the brazed material showed an excellent metal to ceramic bond.

While there has been shown and described what are at present considered the preferred embodiments of the invention, it will be obvious to those skilled in the art that various changes and modifications may be made therein without departing from the scope of the invention as defined by the appended claims.

What is claimed is:

1. A brazing alloy consisting essentially of from about 0.25% to about 5% by weight of a reactive metal selected from the group consisting of titanium, vanadium, zirconium and mixtures thereof, from about 25% by weight to about 85% by weight of a gold-palladium mixture and from about 15% by weight to about 70% by weight of a third metal selected from the group consisting of copper, nickel and mixtures thereof.

2. An alloy according to claim 1 wherein said reactive metal is titanium.

3. An alloy according to claim 2 wherein said third metal is copper in an amount of from about 5% to about 65% by weight.

4. An alloy according to claim 2 wherein said third metal is nickel in amounts of from about 17% by weight to about 40% by weight.

* * * * *

UNITED STATES PATENT AND TRADEMARK OFFICE
CERTIFICATE OF CORRECTION

PATENT NO. : 4,678,636
DATED : 7/07/87
INVENTOR(S) : Howard Mizuhara

It is certified that error appears in the above—identified patent and that said Letters Patent are hereby corrected as shown below:

Title should read:

Ductile Brazing Alloy Containing Reactive Metals and Precious Metals

Signed and Sealed this

Fifteenth Day of December, 1987

*Attest:*

DONALD J. QUIGG

*Attesting Officer*  *Commissioner of Patents and Trademarks*